(12) United States Patent
Chang et al.

(10) Patent No.: US 7,352,720 B2
(45) Date of Patent: Apr. 1, 2008

(54) SYSTEM AND METHOD TO DETERMINE A BIT ERROR PROBABILITY OF RECEIVED COMMUNICATIONS WITHIN A CELLULAR WIRELESS NETWORK

(75) Inventors: Li Fung Chang, Holmdel, NJ (US);
Yongqian Wang, Woodbridge, NJ (US);
Huaiyu Zeng, Red Bank, NJ (US);
Xiaoxin Qiu, Bridgewater, NJ (US);
Baoguo Yang, Iselin, NJ (US)

(73) Assignee: Broadcom Corporation, Irvine, CA (US)

(*) Notice: Subject to any disclaimer, the term of this patent is extended or adjusted under 35 U.S.C. 154(b) by 752 days.

(21) Appl. No.: 10/840,977

(22) Filed: May 7, 2004

(65) Prior Publication Data
US 2004/0252647 A1    Dec. 16, 2004

Related U.S. Application Data

(60) Provisional application No. 60/478,922, filed on Jun. 16, 2003.

(51) Int. Cl.
*H04Q 7/00* (2006.01)

(52) U.S. Cl. .................. 370/333; 455/67.13; 370/252

(58) Field of Classification Search .................. None
See application file for complete search history.

(56) References Cited

U.S. PATENT DOCUMENTS

| 6,456,598 | B1 | 9/2002 | Le Strat | |
| 6,539,205 | B1 | 3/2003 | Wan | |
| 7,203,461 | B2* | 4/2007 | Chang et al. | 455/67.13 |
| 2002/0186761 | A1 | 12/2002 | Corbaton | |
| 2004/0203463 | A1* | 10/2004 | Chen et al. | 455/67.13 |

FOREIGN PATENT DOCUMENTS

| EP | 1 033 852 A1 | 2/1999 |
| EP | 1 176 750 A | 1/2002 |
| WO | WO 00/69023 | 11/2000 |
| WO | WO 01/33792 A1 | 5/2001 |

OTHER PUBLICATIONS

Ariyavisitakul S. L., et al; "A Broadband Wireless Packet Technique Based on Coding, Diversity and Equalization"; Universal Personal Communications 1998; (p. 363-367).

* cited by examiner

*Primary Examiner*—Doris H. To
*Assistant Examiner*—Christopher Grey
(74) *Attorney, Agent, or Firm*—Garlick Harrison & Markison; Robert A. McLauchian

(57) ABSTRACT

RF communications received by a wireless terminal from a servicing base station are used to determine the BEP. These RF communications may be in the form of RF bursts that are part of a data frame. The signal to noise ratio (SNR) of the RF burst is determined and a sequence of soft decisions from the RF burst are extracted. The SNR maps to an estimated BEP based upon the modulation format and coding scheme of the RF burst. The soft decisions decode to produce a data block. When the soft decisions decoded favorably, the re-encoded data block produces a sequence of re-encoded decisions. Comparing the re-encoded decisions to the soft decisions yields a re-encoded bit error (RBER). When the decoding is unsuccessful, the BEP is estimated only upon the estimated BEP derived from the SNR. Otherwise, both the estimated BEP and RBER may be used to determine the BEP.

41 Claims, 12 Drawing Sheets

SYSTEM AND METHOD TO DETERMINE A BIT ERROR PROBABILITY OF RECEIVED COMMUNICATIONS WITHIN A CELLULAR WIRELESS NETWORK

CROSS REFERENCES TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems, and more particularly to the determination of a bit error probability of radio frequency communications received by a wireless terminal within a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 20 ms frame that is divided into four sub-frames, each including eight slots of approximately 625 μs in duration. Each slot corresponds to a Radio Frequency (RF) burst. A normal RF burst, used to transmit information, typically includes a left side, a midamble, and a right side. The midamble typically contain a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless communication systems need the ability to determine which coding scheme and modulation format will result in the successful receipt and demodulation of the information contained within the RF burst. This decision may be further influenced by changing radio conditions and the desired quality level to be associated with the communications.

Link adaptation (LA) is a. mechanism used to adapt the channel coding schemes and modulation formats to the changing radio link conditions. LA allows the network to command the handset to change to the modulation and coding scheme that is best for the current radio condition while providing a desired level of quality associated with the communications. To facilitate LA, an accurate or representative measure of the changing radio conditions is required. The actual Bit Error Rate (BER) associated with the changing radio conditions would provide such a measure. However, exact BER evaluation is often intractable or numerically cumbersome. Therefore, approximations or probabilities of the BER are sought. Such approximations may be referred to as the Bit Error Probability (BEP).

Methods used to estimate the BEP often rely on additive white-Gaussian noise (AWGN) to compute the signal to noise ratio (SNR) from which the BEP is based. Although this method is easy to apply, using the standard Gaussian approximation often overestimates system performance. This over estimation of system performance can result in optimistic BEPs being used to make LA decisions. LA decisions based upon optimistic BEP can result in lost communications between the wireless terminal and the servicing base station. Therefore a need exists to determine more accurate BEPs for use in LA decisions processes.

BRIEF SUMMARY OF THE INVENTION

In order to overcome the shortcomings of prior devices, the present invention provides a system and method to determine the bit error probability (BEP) of a received radio frequency (RF) burst within a data frame that substantially addresses the above identified needs. More specifically, one embodiment of the present invent provides a method of processing RF bursts within a wireless terminal in order to determine the BEP. This RF burst is part of a data frame that is received from a servicing base station by a wireless terminal in a cellular wireless communication system. The signal to noise ratio (SNR) of the RF burst is determined and sequences of soft decisions from the RF burst are extracted. Typically, the SNR is derived from the training sequences within the RF burst and the SNR maps to an estimated BEP based upon the modulation format and coding scheme of the RF burst. Soft decisions within the RF burst may be extracted from either the data bits or the training sequences within the RF burst. The sequences of soft decisions decode to produce a data block. A determination is also made whether the decoding of the sequence of soft decisions was successful. When the sequence of soft decisions decoded favorably the data block is re-encoded to produce a sequence of re-encoded decisions. Comparing the sequence of re-encoded decisions to the sequence of soft decisions yields a re-encoded bit error (RBER). When the decoding is unsuccessful, the BEP is estimated only upon the estimated BEP derived from the SNR. However, when the decoding is successful, both the estimated BEP and RBER may be used to determine the BEP.

Another embodiment of the present invention provides a wireless terminal having a radio frequency (RF) front end, a base band processor communicatively coupled to the RF front end, and an optional enCOder/DECoder (CODEC) processing module which if present is communicatively coupled to the base band processor. The combination of the RF front end, base band processor, and the CODEC processing module (if present) operate to receive and process RF bursts from the servicing base station. The combination determines the SNR of the RF burst and uses the SNR to determine an estimated BEP. Sequences of soft decisions, extracted from the RF burst, decode to produce a data block. The combination then determines whether or not the sequence of soft decisions was decoded successfully to the data block. When the sequence of soft decisions decoded favorably, the data block is re-encoded to produce a sequence of re-encoded decisions. The sequence of soft decisions when compared to the sequence of re-encoded decisions produces a RBER: The combination determines the BEP based upon the estimated BEP derived from the SNR when the decoding is unsuccessful. However, when the decoding is successful, the combination uses both the estimated BEP and RBER to determine the BEP to be reported to the servicing base station.

Yet another embodiment of the present invention provides a method to determine the BEP of RF communications received from servicing base stations by a wireless terminal in a cellular wireless communication system. As in the previous embodiments, the wireless terminal receives RF bursts from the servicing base station. The signal to noise ratio (SNR) of the RF burst is determined and sequences of soft decisions are extracted. Typically, the SNR derives from the training sequences within the RF burst and maps to an estimated BEP based upon the modulation format and coding scheme of the RF burst. Soft decisions within the RF burst may be extracted from either the data bits or the training sequences within the RF burst. The sequences of soft decisions decode to produce a data block. If decoded successfully, the data block is re-encoded to produce a sequence of re-encoded decisions, for comparison to the sequence of soft decisions to produce the RBER. In this embodiment, the BEP is then determined based on the estimated BEP derived from the SNR and the RBER. However, this embodiment uses both the estimated BEP and RBER whether or not the soft decisions decoded unfavorably. The estimated BEP is weighed more heavily when the sequence of soft decisions decoded unfavorably and the RBER is weighed more heavily when the sequence of soft decisions decoded favorably. Further, the RBER may correspond to the sequence of soft decisions having a bit error rate exceeding a threshold value when the sequence of soft decisions decoded unfavorably. Assigning a threshold value to the RBER when the soft decisions decode unfavorably may limit the reporting of an overly optimistic BEP (based only on the SNR) to the servicing base station when the soft decisions decoded unfavorably.

Other features and advantages of the present invention will become apparent from the following detailed description of the invention made with reference to the accompanying drawings.

DETAILED DESCRIPTION OF THE DRAWINGS

Figure 1:
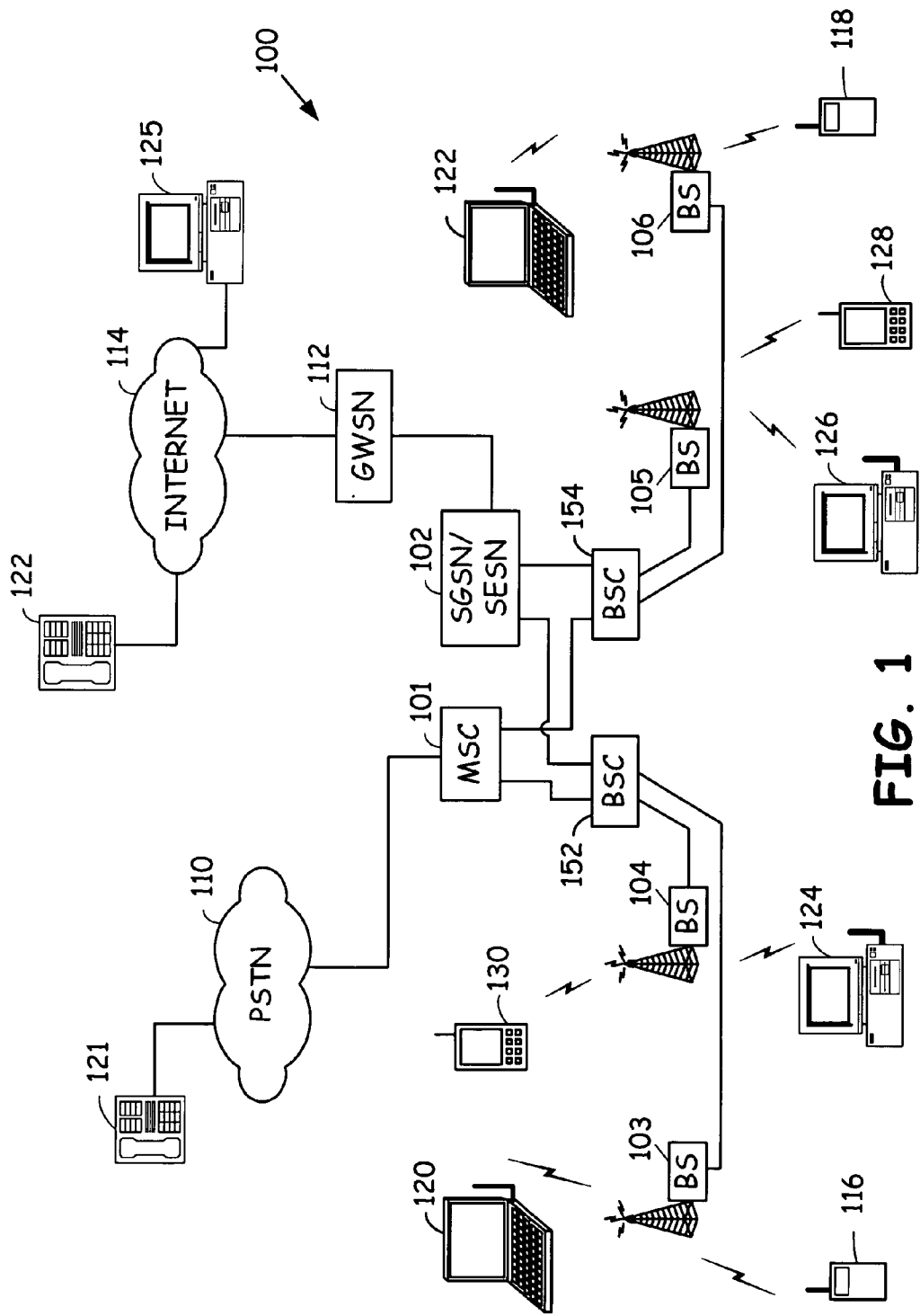
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless, terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that apply dynamic link adaptation (LA) of the Modulation and Coding schemes (MCSs) utilized for communications between wireless terminals and servicing base stations.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate (forward link) requirements while the upload data-rate (reverse link) requirements are not as severe. Some or all of the wireless terminals 116-130 are therefore enabled to support the EDGE operating standard. These wireless terminals 116-130 also support the GSM standard and may support the GPRS standard. Wireless terminals 116-130 support the LA decision making process by determining the bit error probability (BEP) of received radio frequency (RF) communications received from by base stations 103-106 and reporting this BEP to the wireless communication system 100. The wireless communication system 100 then uses the provided BEP information to select an appropriate MCS.

Wireless terminals 116-130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
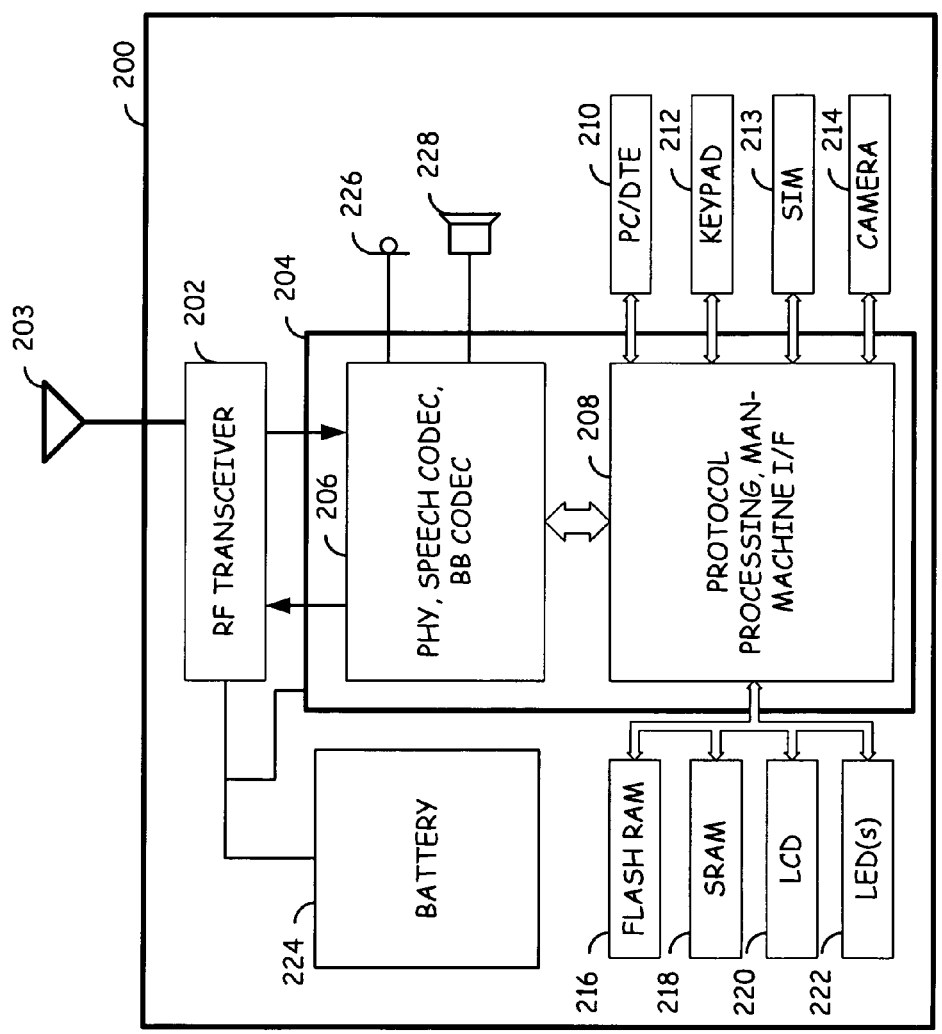
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
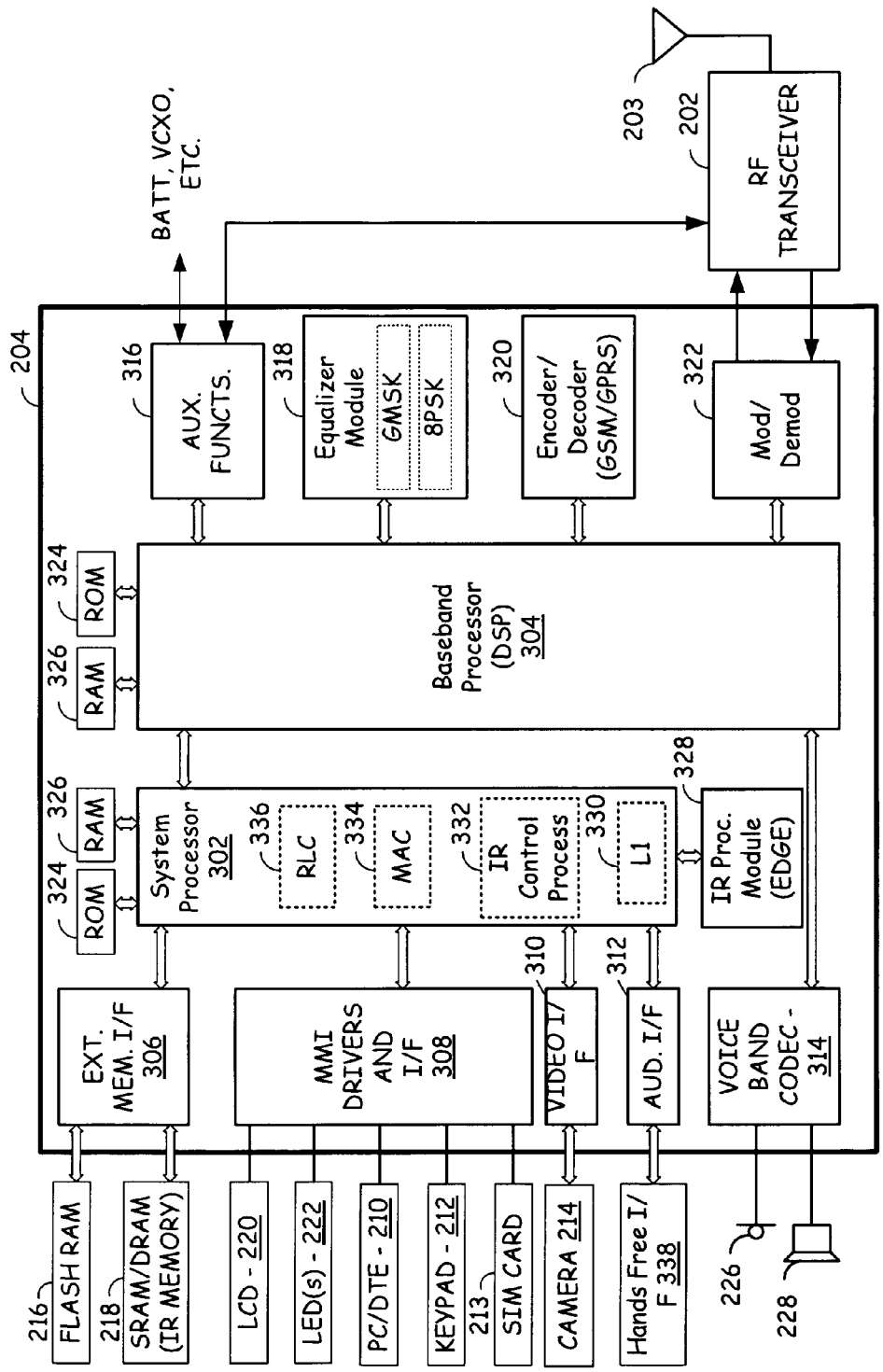
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5-6B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications from the servicing base station. In one embodiment the RF front end 202 and base band processor 204 determine the SNR of the RF burst. Then, the SNR is used to determine an estimated BEP. Concurrently or serially, base band processor 204 to produce a data block decodes sequences of soft decisions, extracted from the RF burst. The sequence of soft decisions may decode successfully into the data block as indicated by error correction coding results. Re-encoding of properly decoded data blocks produces a sequence of re-encoded decisions which when compared to the sequence of soft decisions produces a Re-encoded Bit Error (RBER). The BEP reported to the servicing base station is based upon the estimated BEP derived from the SNR and the RBER. When the decoding is unsuccessful, the BEP may be based upon more heavily or solely the estimated BEP provided by the SNR. Similarly, when the decoding is successful, the BEP may be based upon more heavily or solely the RBER. This allows the BEP to more accurately reflect actual channel conditions. Thus, LA decisions can more effectively select an appropriate MCS based upon existing channel conditions.

Figure 4:
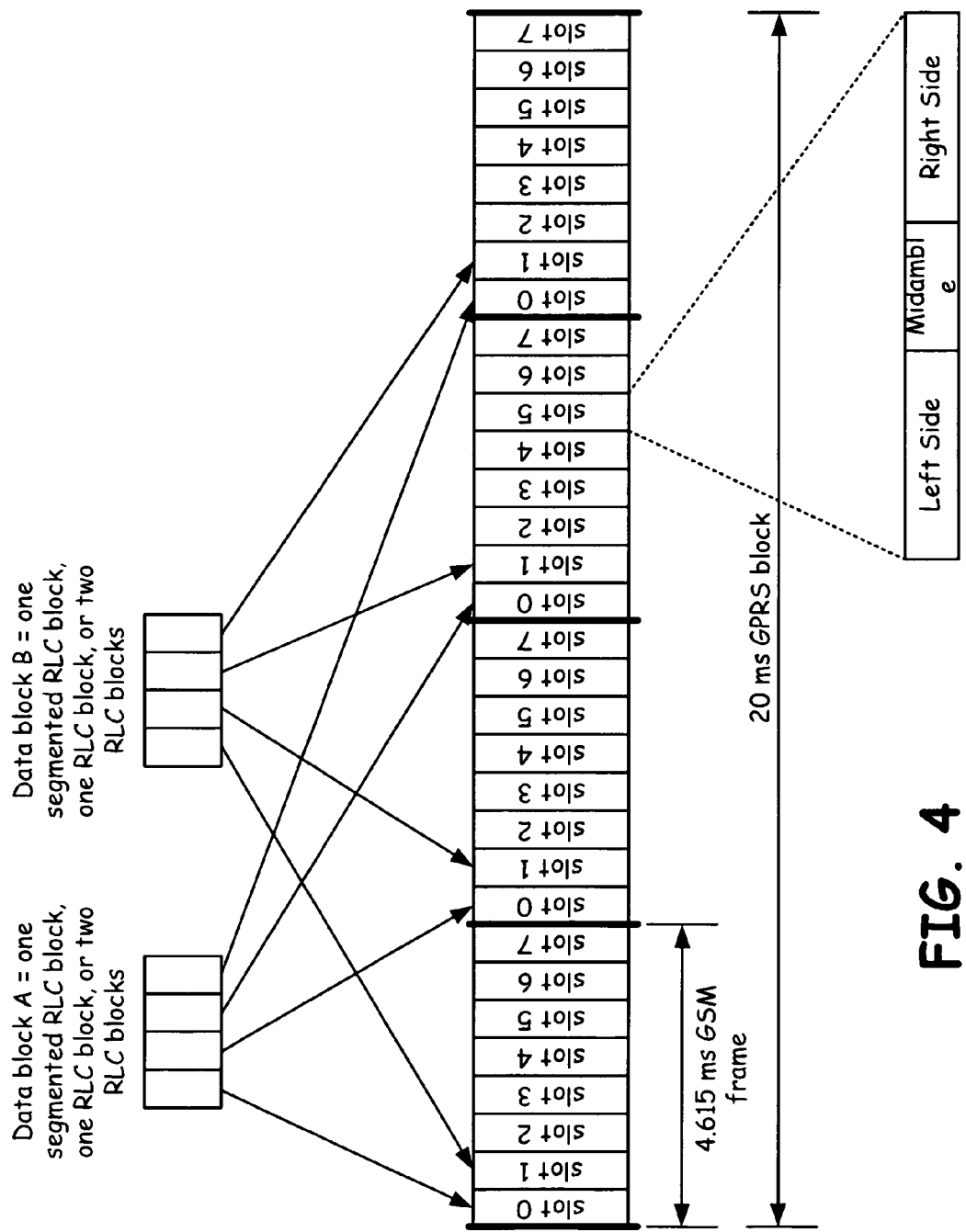
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 µs in duration, includes a left side, a midamble, and a right side. The left side and right side of a normal RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1-7 of each sub-frame, may differ. This ability allows LA to be implemented. As will be described further with reference to FIG. 5, the wireless terminal 200 may be assigned multiple slots for forward link transmissions that must be received and processed by the wireless terminal 200.

Figure 5:
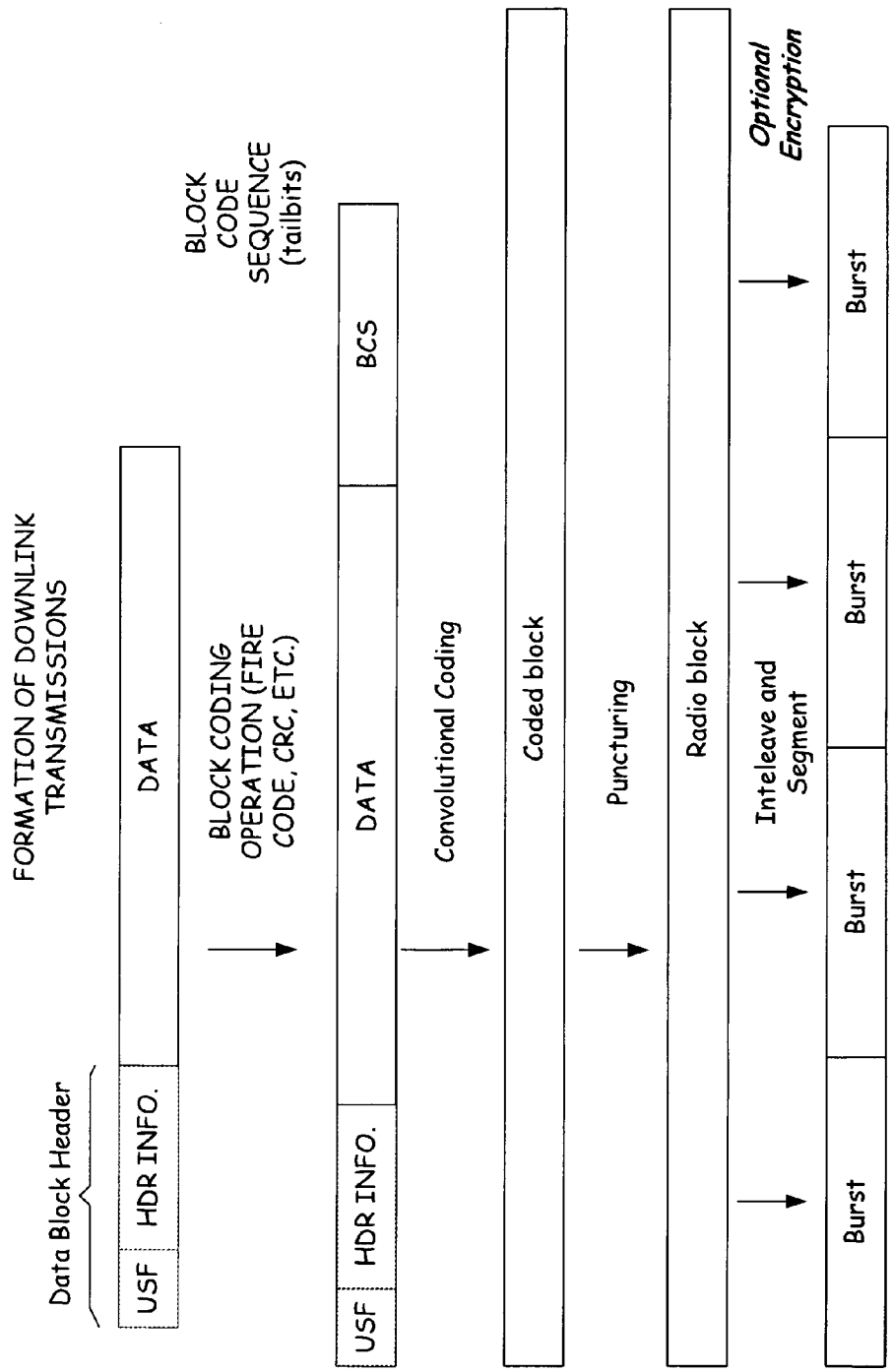
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
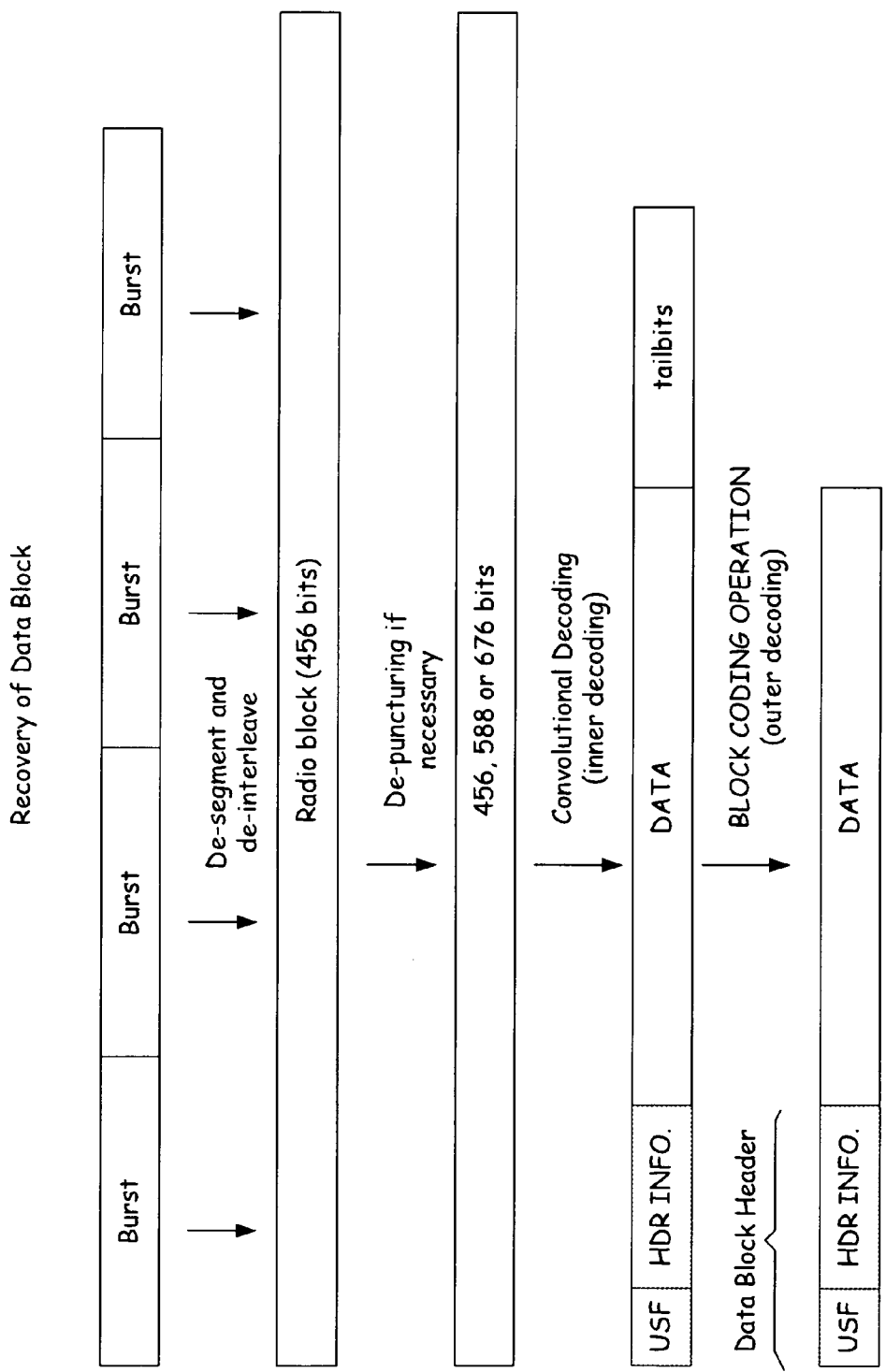
FIG. 6 is a block diagram illustrating the recovery of a data block from a down link transmissions.

FIG. 6 is a block diagram depicting the various stages associated with recovering a data block from an RF burst. Four RF bursts making up a data block are received and processed. Once all four RF bursts have been received, the RF bursts are combined to form an encoded data block. However, in some instances the encoded data block may be recovered from fewer than all four RF bursts. This ability depends upon the robustness of the modulation format and coding scheme. The encoded data block is then depunctured (if required), decoded according to an inner decoding scheme, and then decoded according to an outer decoding scheme. The decoded data block includes the data block header and the data. Successful decoding may be signaled by appropriate tailbits appended to the data following convolutional decoding (error correction coding).

Figure 7:
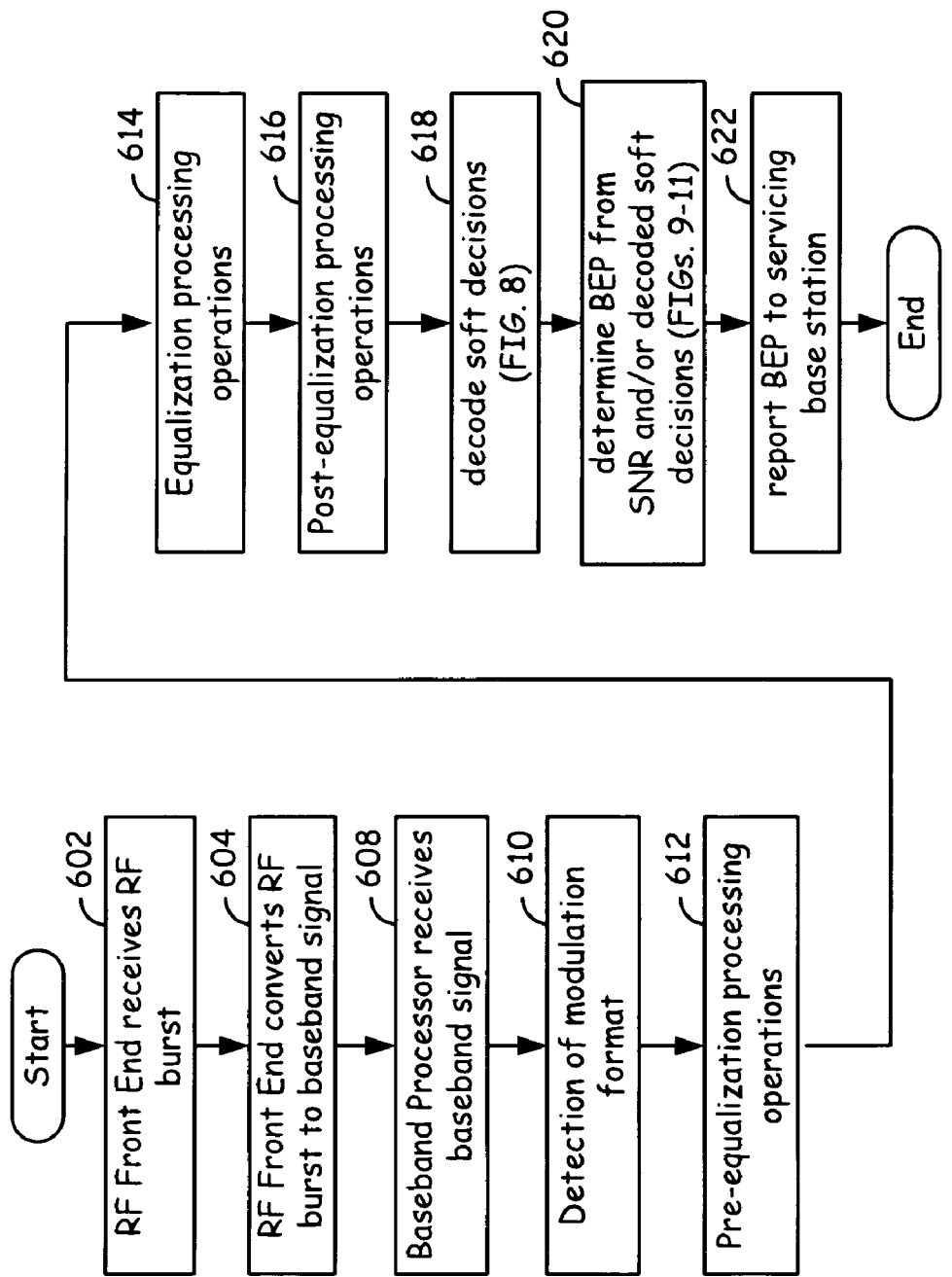
FIG. 7 is a flow chart illustrating operation of a wireless terminal in receiving and processing a RF burst.

FIG. 7 is a flow charts illustrating operation of a wireless terminal 200 in receiving and processing a RF burst. The operations illustrated correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6-10.

Referring particularly to FIG. 7, operation commences with the RF front end 202 receiving an RF burst in a corresponding slot of a GSM frame (step 602). The RF front end 202 then converts the RF burst to a baseband signal (step 604). Upon completion of the conversion, the RF front end 202 stores the converted baseband signal. When needed the baseband processor samples the converted baseband signal from the RF front end. Thus, as referred to in FIG. 7, the RF front end 202 performs steps 602-604.

Operation continues with the baseband processor 304 receiving the baseband signal (step 608). In a typical operation, either the RF front end 202, the baseband processor 304, or modulator/demodulator 322 samples the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. Proper determination of the modulation format is necessary in order to properly determine the SNR of the channel and RBER associated with the data contained within the RF burst. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and appropriately processes the RF burst based upon the detected modulation format.

The baseband processor performs pre-equalization processing of the RF burst in step 612. For GMSK modulation, this processing involves de-rotation and frequency correction; burst power estimation; timing, channel, noise, and signal-to-noise ratio (SNR) estimation; automatic gain control (AGC) loop calculations; soft decision scaling factor determination; and matched filtering operations on the baseband signal. For 8PSK modulation, pre-equalization processing of the RF burst involves de-rotation and frequency correction; burst power estimation; timing, channel, noise, and SNR estimations; AGC loop calculations; Decision Feedback Equalizer (DFE) coefficients calculations; and soft decision scaling factors for the baseband signal. The SNR estimation from the pre-equalization processing operations may be used later to determine the estimated BEP. Determination of the estimated BEP will be discussed further in FIGS. 9-11. These pre-equalization processing operations produce a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation in step 614. The equalizer module 318 receives the processed baseband signal, settings, and/or parameters from the baseband processor 304 and equalizes the processed baseband signal. For GMSK, equalization-processing operations involve Maximum Likelihood Sequence Estimation (MLSE) equalization on the left side and right side of the baseband signal to produce soft decisions for the left side and right side. As was shown previously with reference to FIG. 4, each RF burst contains a left side of data, a midamble, and a right side of data. The midamble includes predefined training sequence that may be based on the modulation format. For 8PSK, the equalizer module 318 first prepares state values that it will use in equalizing the 8PSK modulated processed baseband signal. Then equalizer module 318 uses a Maximum A posteriori Probability (MAP) equalizer to equalize the left and right sides of the processed baseband signal to produce soft decisions for the processed baseband signal.

After equalization, the equalizer module 318 then issues an interrupt to the baseband processor 304 indicating that the equalizer operations are complete for the RF burst. The baseband processor 304 then receives the soft decisions from the equalizer module 318. Next, the baseband processor 304 performs "post-equalization processing" as shown in step 616. This may involve determining an average phase of the left and right sides based upon the soft decisions received from the equalizer module 318 and frequency estimation and tracking based upon the soft decisions received from the equalizer module 318.

The sequences of soft decisions are decoded in step 618. One particular method of decoding the soft decisions is further detailed in FIG. 8. The decoded soft decisions may be used to produce a RBER. This process of producing an RBER will be described in further detail in association with the description of FIGS. 9-11 and following. With the estimated BEP and/or RBER, baseband processor 304 or system processor 302 produce a BEP, which is reported to the servicing base station. While the operations of FIG. 7 are indicated to be performed by particular components of the wireless terminal, such segmentation of operations could be performed by differing components. For example, the equalization operations could be performed by the baseband processor 304 or system processor 302 in other embodiments. Further, the baseband processor 304 or the system processor 302 in other embodiments could also perform decoding operations.

Figure 8:
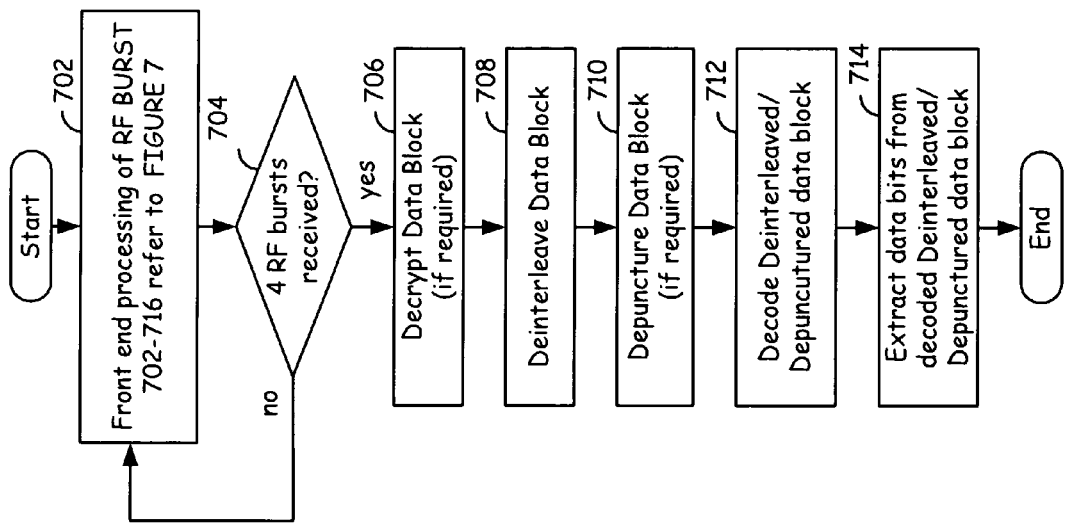
FIG. 8 is a flow chart illustrating operations to recover a data block according to an embodiment of the present invention.

FIG. 8 is a flow chart illustrating operations to decode a data block according to an embodiment of the present invention. Operations commence with receiving and processing an RF burst in step 702 and as described with reference to FIG. 7. After receiving the four RF bursts that complete an EDGE or GPRS data block, as determined at step 704, operation proceeds to step 706.

A header of the data block identifies the coding scheme and puncturing pattern of the data block. For example, the coding scheme may be any one of the CS-1 through CS-4 or MCS-1 through MCS-9 coding schemes, each of which may include multiple puncturing patterns. Operation according to the present invention uses the training sequence of each RF burst, located within the midamble of the RF burst, to identify the modulation format of the RF burst.

Data recovery begins in step 706 where, if necessary, the data block is decrypted. The data block is then de-interleaved (step 708) according to a particular format of the data block, e.g. MCS-1 through MCS-9 or CS-1 through CS-4. The data block is then de-punctured (step 710). At step 712, the de-interleaved and de-punctured data block is decoded. Decoding operations may include combining previously received copies of the data block with the current copy of the data block. Data bits of the decoded data block are then extracted and processed further (step 714). Properly decoded data blocks can be re-encoded to produce a sequence of re-encoded decisions that when compared to the sequence of decoded soft decisions result in the RBER. The RBER may provide a more accurate indication of the performance of the selected MCS than that provided by the estimated BEP, which is based on the SNR.

Figure 9A:
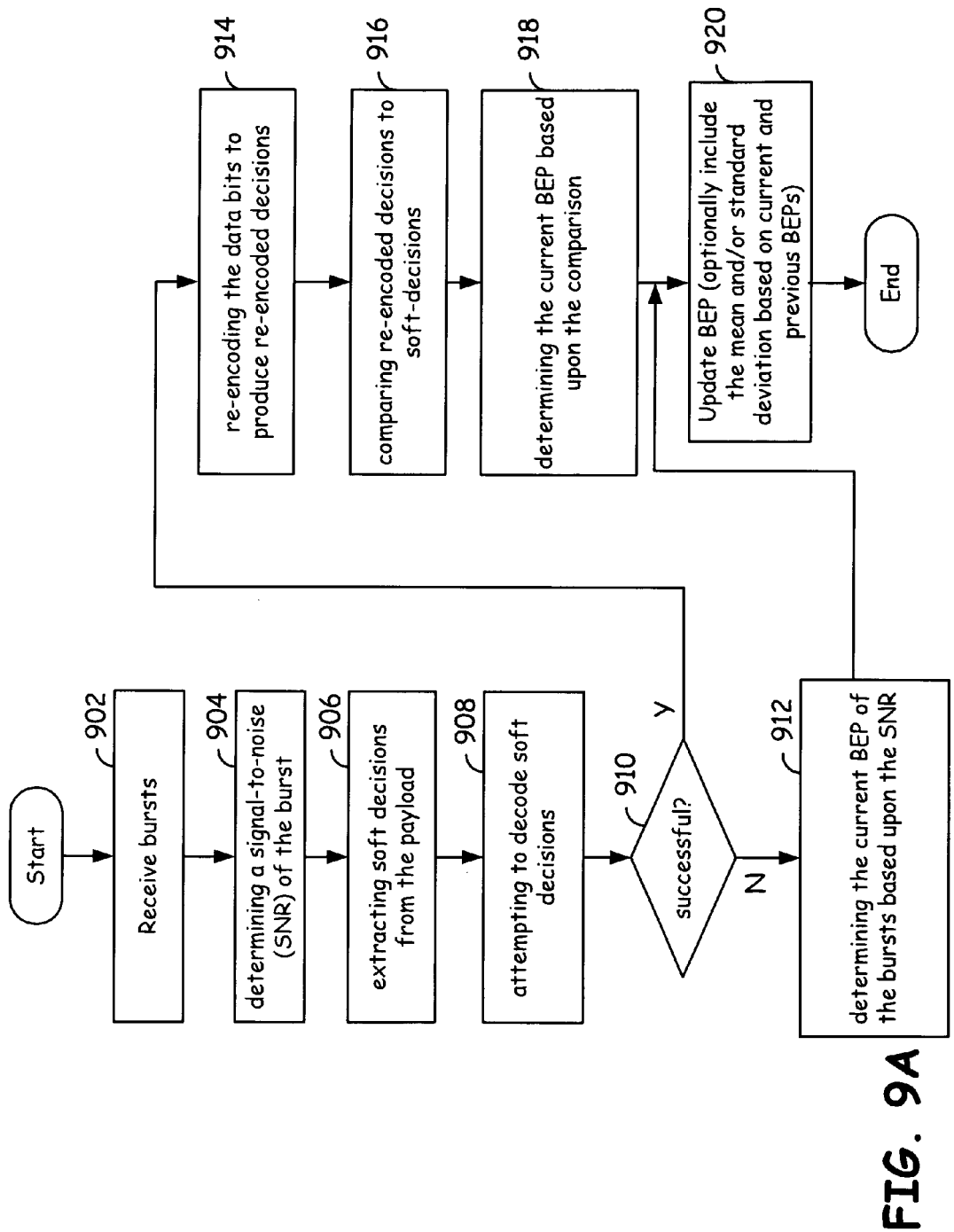
FIGS. 9A and 9B are logic diagrams illustrating methods for operating a wireless terminal to determine a BEP of a received burst according to the present invention.

FIG. 9A is a logic diagram illustrating a method for operating a wireless terminal to determine a BEP of a received burst according to the present invention. The method commences with receiving the RF burst in step 902. Next, the signal-to-noise (SNR) of the RF burst is determined in step 904. The determination of the SNR in step 904 is typically completed as part of the pre-equalization processing of step 612. One embodiments utilizes the extracted training sequences of the RF bursts to produce the SNR and map to an estimated BEP based on the MCS. This will be further detailed in the description associated with Tables 1 and 2. Continuing with step 906, a sequence of soft decisions is extracted from the payload. This sequence may correspond to the training sequence or data, wherein the greater number of samples available within the data portion would yield more accurate results than those derived from the smaller sample set of the training sequence. An attempt to decode the sequence of soft decisions is made in step 908. When the attempt to decode the plurality of soft decisions is unsuccessful (as determined at decision point 910), the BEP of the RF burst is determined based upon the SNR (estimated BEP) in step 912. When the sequence of soft decisions decodes successful at decision point 910, the data bits are re-encoded to produce a sequence re-encoded decisions at step 914. Then, the sequence of re-encoded decisions is compared to the sequence of soft-decisions in step 916. This comparison results in a RBER upon which the BEP may be based (step 918). The BEP may be transmitted to a servicing base station in step 920. This process may also include the historical performance of the BEP in determining the BEP reported to the servicing base station by including the mean and/or standard deviation in the determination of the BEP.

Figure 9B:
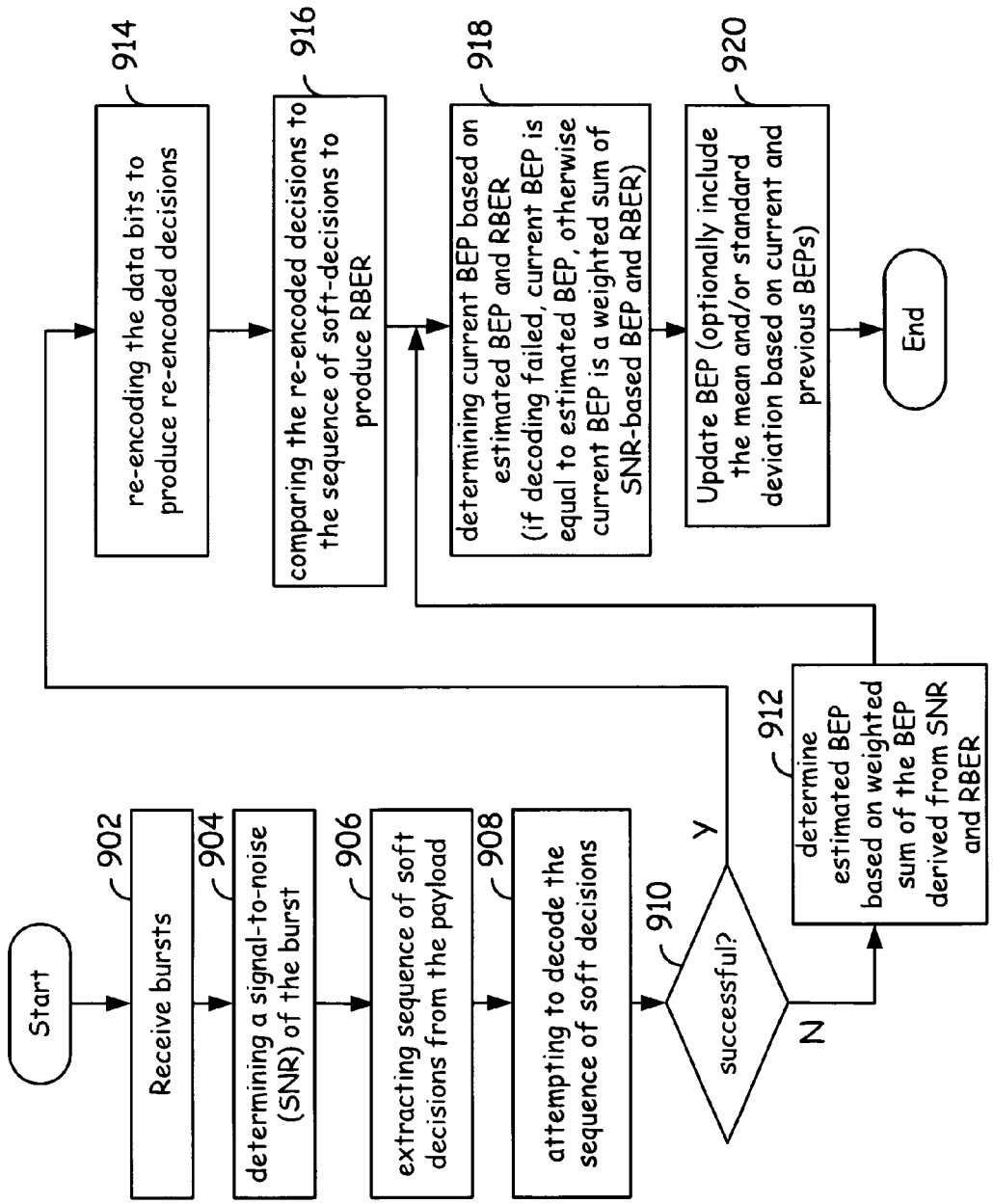

Another embodiment, as illustrated in FIG. 9B, determines the estimated BEP in step 905 with the SNR value of step 904. Additionally, this embodiment assigns a threshold value to the RBER at step 911 when the attempt to decode the plurality of soft decisions is unsuccessful (as determined at decision point 910). This allows the BEP of the RF burst to be determined based upon both the SNR (estimated BEP of step 905) and RBER when unsuccessful decoding occurs. This combination may reduce the BEP reported to the servicing base station when a BEP based only on SNR would prove overly optimistic. Similarly, when the sequence of soft decisions decodes successfully at decision point 910, the BEP of the RF burst may be determined based upon both the SNR (estimated BEP of step 905) and RBER the data bits, wherein different weighting values or coefficients are assigned to the SNR and RBER. These weighting values or coefficients may be based on whether or not the sequence of soft decisions decodes successfully. For example, the weighting values may weigh the SNR more heavily when the sequence of soft decisions decodes unsuccessfully. Alternatively, the weighting values may weigh the RBER more heavily when the sequence of soft decisions decodes successfully. Further, a comparison between the SNR and assigned threshold value of the RBER when the sequence of soft decisions decodes unsuccessfully may examine the relative magnitude of the estimated BEP and RBER and limit the BEP to be the lesser of the two. As in FIG. 9A, this process may also include the historical performance of the BEP in determining the BEP reported to the servicing base station by including the mean and/or standard deviation, or other like functions, in the determination of the BEP. In yet another embodiment to be described in FIG. 11, the BEP reported to the servicing base station may be incremented or decremented depending on whether or not the sequence of soft decisions decodes successfully.

Figure 10:
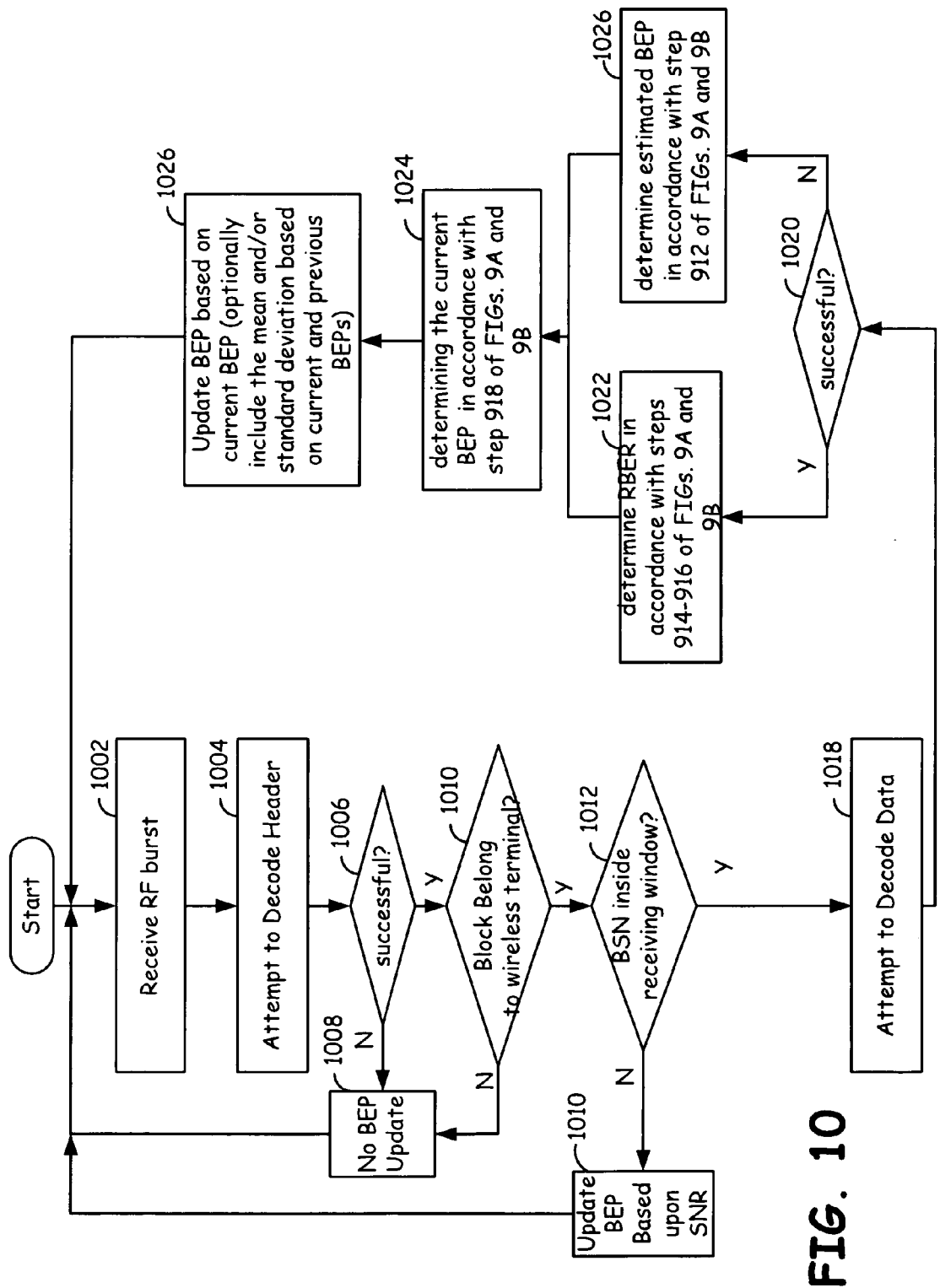
FIG. 10 is a logic diagram illustrating another embodiment of a method for operating a wireless terminal to determine a BEP of a received burst according to the present invention.

FIG. 10 is a logic diagram illustrating another embodiment of a method for operating a wireless terminal to determine a BEP of a received RF burst according to the present invention. As previously stated, Link adaptation (LA) provides a mechanism used in EDGE to adapt the channel coding schemes and modulation formats to the changing radio link conditions. LA allows the network to command the handset to change to the different modulation and coding scheme that is best for the current radio condition. To facilitate the network to do so, the, handset reports a downlink quality report to the network via the servicing base station. The downlink quality report may include an estimated BEP based on the SNR of the RF burst and the RBER of the RF burst as well as the mean BEP (Mean_BEP) and standard deviation of the BEP (CV_BEP) of a RLC block (4 radio bursts) averaged over the reporting period and all assigned time slots per modulation type. They are derived as follows:

$$\text{MEAN\_BEP}_n = \frac{\sum_j R_n^{(j)} \cdot \text{MEAN\_BEP\_TN}_n^{(j)}}{\sum_j R_n^{(j)}}$$

$$\text{CV\_BEP}_n = \frac{\sum_j R_n^{(j)} \cdot \text{CV\_BEP\_TN}_n^{(j)}}{\sum_j R_n^{(j)}}$$

Where n=the iteration index at reporting time
j=the channel number.

And $$\text{MEAN\_BEP\_TN}_n = \quad (\text{Eq. 1})$$

$$\left(1 - e \cdot \frac{x_n}{R_n}\right) \cdot \text{MEAN\_BEP\_TN}_{n-1} + e \cdot \frac{x_n}{R_n} \cdot \text{MEAN\_BEP}_{block,n}$$

$$\text{CV\_BEP\_TN}_n =$$

$$\left(1 - e \cdot \frac{x_n}{R_n}\right) \cdot \text{CV\_BEP\_TN}_{n-1} + e \cdot \frac{x_n}{R_n} \cdot \text{CV\_BEP}_{block,n}$$

Where: n is the iteration index, incremented per downlink radio block.
$R_n$ denotes the reliability of the filtered quality parameters.
e is the forgetting factor defined by the network.
$x_n$ denotes the existence of quality parameters for the $n^{th}$ block, i.e. whether the radio block is intended for this MS. $x_n$ values 1 or 0, denoting the existence and absence of quality parameters, respectively.

Key challenges in LA are the algorithm used in the network for link adaptation control, and the accuracy of the $\text{MEAN\_BEP}_{block, n}$ and $\text{CV\_BEP}_{block, n}$ calculated by the handset, where $\text{MEAN\_BEP}_{block, n}$ is the BEP value averaged over 4 radio bursts for a given RLC block and $\text{CV\_BEP}_{block, n}$ is the corresponding standard deviation.

There are several ways to obtain $\text{MEAN\_BEP}_{block, n}$. For example, the $\text{MEAN\_BEP}_{block, n}$ can be derived based on: (1) signal-to-noise ratio (SNR); (2) re-encoding correctly decoded data; or (3) the training sequence. SNR-based BEP requires robust SNR-to-BEP mapping table that covers all types of propagation environments. SNR based approximations often overestimate system performance. This over estimation of system performance can result in optimistic BEPs being used to make LA decisions. LA decisions based upon optimistic BEP can result in lost communications between the wireless terminal and the servicing base station. Furthermore, extensive computer simulations are therefore needed to generate this mapping table.

RBER count provides a better measurement for the current link quality regardless of the radio propagation environments. Thus re-encoding based BEP can better reflect the link quality, however, this value is available only if the data block is decoded correctly. Training sequence based BEP calculation can be easily obtained but it does not provide enough samples (26 for GMSK, 78 for 8PSK) for BEP averaging. However, one bad RBER count could severely impact the selected MCS. Therefore historical factors such as the mean and standard deviation provide improved ways of establishing thresholds for LA decisions. The present invention provides better results by combining methods 1 through 3.

One particular embodiment uses a joint SNR and re-encoding based BEP algorithm. This allows the wireless terminal to report the BEP regardless of the data decoding status. The estimated RF burst SNR may be derived using the training sequence. The estimated RF burst SNR and corresponding modulation type, determined as described in FIG. 7, are then placed in shared memory for the ARM to process the final BEP report. SNR-BEP tables, derived from AWGN channel for 8PSK and GMSK together with pre-defined thresholds, and RBER, constitute the basis of this algorithm. The pre-defined threshold is denoted as BEP_th. This threshold depends on the MCS mode and is determined by the error-correction capability of the given MCS mode. For example SNR-BEP tables for 8PSK and GMSK are listed in Table 1 and Table 2, respectively.

TABLE 1

SNR-BEP Mapping for 8PSK

| SNR (dB) | Corresponding DSP format (=16SNRdB) | BEP | Corresponding DSP format |
|---|---|---|---|
| 8 | 128 | 0.2721 | 2229 |
| 9 | 144 | 0.2477 | 2029 |
| 10 | 160 | 0.2234 | 1830 |
| 11 | 176 | 0.1993 | 1633 |
| 12 | 192 | 0.1736 | 1422 |
| 13 | 208 | 0.1471 | 1205 |
| 14 | 224 | 0.1211 | 992 |
| 15 | 240 | 0.0951 | 779 |
| 16 | 256 | 0.0704 | 577 |
| 17 | 272 | 0.0487 | 399 |
| 18 | 288 | 0.0305 | 250 |
| 19 | 304 | 0.0167 | 137 |
| 20 | 320 | 0.0079 | 65 |
| 21 | 336 | 0.0032 | 26 |
| 22 | 352 | 0.0010 | 8 |
| 23 | 368 | 0.0001 | 1 |

TABLE 2

SNR-BEP Mapping for GMSK

| SNR (dB) | Corresponding DSP format (=16SNRdB) | BEP | Corresponding DSP format |
|---|---|---|---|
| 3 | 48 | 0.1929 | 1580 |
| 4 | 64 | 0.1450 | 1188 |
| 5 | 80 | 0.1061 | 869 |
| 6 | 96 | 0.0724 | 593 |
| 7 | 112 | 0.0464 | 380 |
| 8 | 128 | 0.0277 | 227 |
| 9 | 144 | 0.0149 | 122 |
| 10 | 160 | .0070 | 57 |
| 11 | 176 | 0.0026 | 21 |
| 12 | 192 | 0.0007 | 6 |
| 13 | 208 | 0.0001 | 1 |
| 14 | 224 | 0 | 0 |

Referring now to the operations of FIG. 10, a burst is received (step 1002). The burst will typically be one of four portions of an RLC block and typically carries a training sequence (mid amble), a header, a data block, and a tail/trailer. Upon receipt of the RF burst, an attempt is made to decode the header (step 1004). Decoding the header allows the coding scheme to be readily identified. This information is coupled with knowledge to the modulation format to determine the MCS of the RF burst. If the decode is not successful (as determined at step 1006), no BEP update is performed (step 1008) and operation returns to step 1002 wherein another burst is awaited. If the header decode is successful (as determined at step 1006), operation proceeds to step 1010 where the wireless terminal determines whether the data block carried in the burst is intended for the wireless terminal. If the data block is not intended for the wireless terminal, the operation proceeds to step 1008 and no BEP update/calculation occurs. This prevents unnecessary BEP calculations and potential LA decisions being based on communications not intended for the wireless terminal.

If the data block carried in the burst does belong to the wireless terminal (as determined at step 1010), the wireless terminal next determines whether the Block Sequence Number (BSN) of the data block is within a receiving window under consideration (step 1012). If not, the BEP is updated based upon the SNR of the block (at step 1014) and operation proceeds from step 1014 to step 1002 where another burst is awaited. If the BSN is inside the receiving window (as determined at step 1012) it is next determined whether Incremental Redundancy (IR) is to be performed upon the received block (step 1016). If IR is to be performed, operation proceeds to step 1014. If not, the wireless terminal attempts to decode the received data block (step 1018).

If the decode attempt of step 1020 is successful, as determined at step 1020, the decoded data is re-encoded in step 1022 to produce a RBER based upon the re-encoded data, and the BEP is updated based upon the RBER count in step 1024. If the decoding attempt is not successful (as determined at step 1020), operation proceeds to step 1026 where the BEP is updated based upon the maximum of the estimated BEP based on SNR, or BEP(mean_SNR), and the pre-defined threshold, BEP_th. From both steps 1024 and 1026 operation returns to step 1002. The BEP update may further include the historical performance of the BEP in determining the BEP update to the servicing base station by including the mean and/or standard deviation of the BEP update in the determination of the BEP.

The operations of FIG. 10 can be summarized in one embodiment by the following logical operations:

```
If (header decode fails)
    Exclude this block from the overall BEP calculation;
Else
    If (the current block is not intended for the wireless terminal)
        Exclude this block from the overall BEP calculation;
    Else
        If (the block sequence number of the block is outside the
        receiving window)
            Use SNR for BEP calculation;
            i.e. MEAN_BEP_block,n = BEP[mean_SNR] (Eq. 2)
                mean_SNR= (SNR_0 + SNR_1 + SNR_2,+ SNR_3) /4 ;
            Where BEP[] is the SNR-BEP function based on either
            Table 1 or Table 2 with interpolation, and SNR_i is the SNR
            of the i^th burst reported by the DSP.
        Else
            If (IR decoding is required for the received block**)
                If (data decoding is correct)
                    Use SNR for BEP calculation based on (Eq. 2);
                Else
                    Use SNR + BEP threshold for BEP calculation
                    i.e. MEAN_BEP_block,n = Max(
                        BEP[mean_SNR], BEP_th);
```

-continued

```
            Else
                If (data decode fails)
                    Use SNR + BEP threshold for BEP
                    calculation
                    i.e. MEAN_BEP_block,n = Max(
                        BEP[mean_SNR], BEP_th);
                Else
                    Use the re-encode bit_error_count from the
                    MP for BEP ( i.e., MEAN_BEP_block,n =
                    bit_error_count/block size);
```

In the operation of FIG. 10, therefore, SNR is typically calculated with the training sequence of the burst to map to an estimated BEP and will be used for BEP calculation whenever the RBER is not available. The training sequence may also be used to produce an RBER based on a smaller sample set than using the data portion would provide. Generally, the SNR provides a reasonable link quality measure for channels free of inter-symbol interference. For channel with inter-symbol interference, SNR alone is not sufficient to measure the quality of the link. Instead, RBER count is a better quality measure. When data decoding fails, the RBER cannot be obtained. In this case, SNR-based BEP calculation will be used with the additional fact that data decoding has failed. This information can help better quantify the downlink quality in combination with the SNR. When data decoding fails, the number of errors in the received block has to exceed some threshold. Therefore, the RBER can be assumed to reach this threshold. This threshold, for a given MCS mode, is related to the error correction capability of the mode and can be obtained via measurements or simulations. The threshold needs to be carefully selected and tested.

Figure 11:
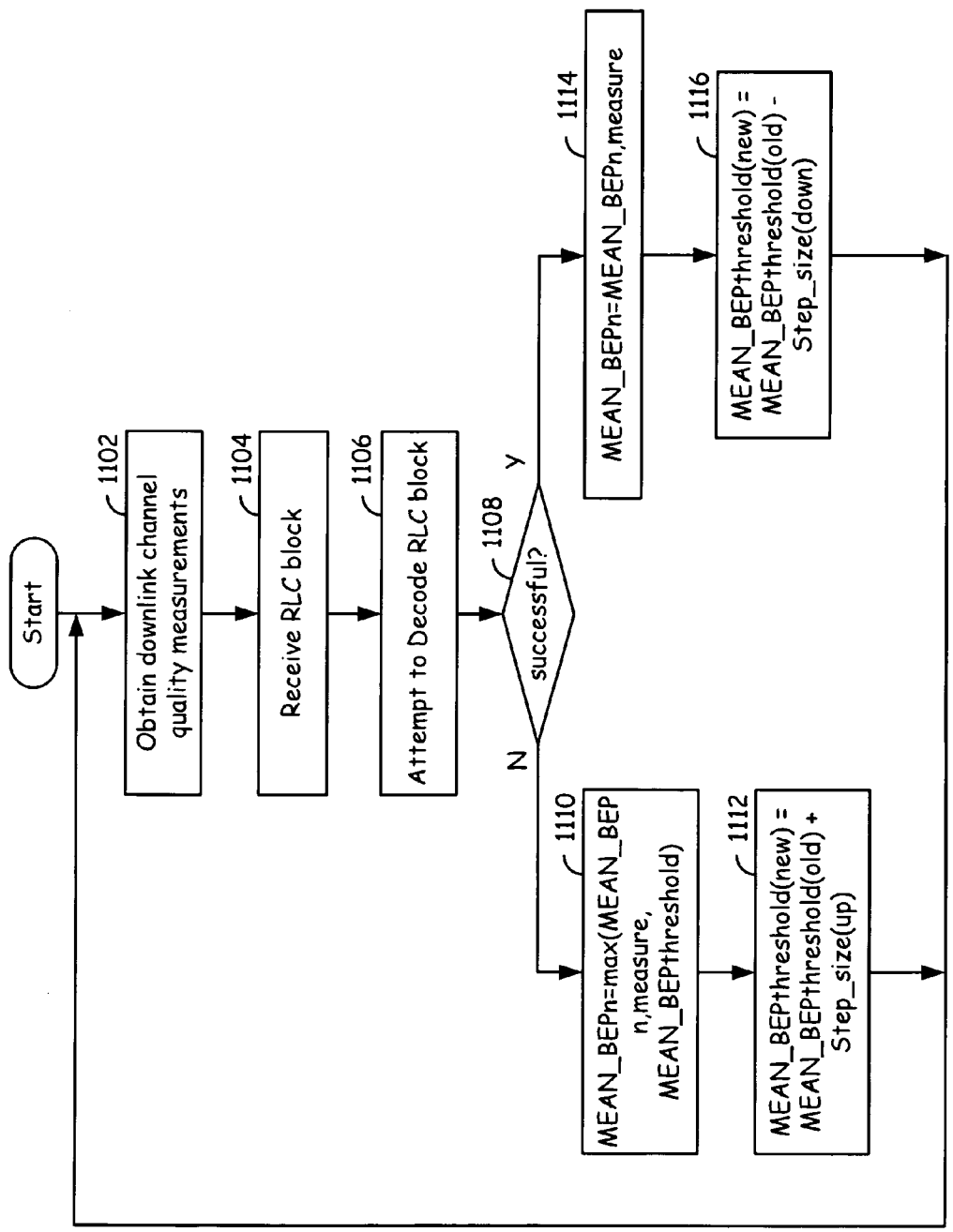
FIG. 11 is a logic diagram illustrating an embodiment of the present invention in determining reported channel quality based upon decoding results.

FIG. 11 is a logic diagram illustrating an embodiment of the present invention in determining reported downlink channel quality based upon decoding results. FIG. 11 illustrates an adaptive channel quality estimation algorithm within the context of an EDGE system (Enhanced Data rate for GSM Evolution). However, the teachings illustrated in FIG. 11 may be applied to other systems equally well. In an EDGE system, $MEAN\_BEP_{block,n}$ is defined as the BEP value averaged over 4 radio bursts for a given RLC block and $CV\_BEP_{block,n}$ is the corresponding standard deviation. There are several ways to obtain $MEAN\_BEP_{block,n}$ in EDGE system. It can be derived based on the (1) signal-to-noise ratio (SNR), (2) re-encoding correctly decoded data, and (3) using training sequence.

Whether the LA can be effective highly depends on the accuracy of the channel downlink quality reports from the wireless terminal and the LA threshold adjustment from the network. However, measurement errors are unavoidable from wireless terminals that experience a fast changing wireless condition. Moreover, the LA threshold on the network is usually adjusted based upon one (or a very few) available test wireless terminals. As a result, these thresholds may not be appropriate for other wireless terminals, leading to unsuitable transmission formats being used for the wireless terminal and thus lower the data throughput. In the worst case, this will lead to data transfer stall, which is more prominent in low receive signal strength conditions (RSSI). To address this issue, the operations of FIG. 11 illustrate an adaptive channel quality estimation algorithm for the wireless communication systems that employ link adaptation.

BEP is used in FIG. 11 as an example of the channel quality measures to describe the adaptive channel quality estimation algorithm.

Operation commences in obtaining the downlink channel quality measurements (e.g. MEAN_BEP and CV_BEP) using any available algorithm (step 1102). Next, an RLC block is received (step 1104), decoding is attempted (step 1106), and it is determined whether the decoding attempt was successful at decision point 1108.

For each RLC block with a decoding error, two steps need to be performed. In a first step 1110, $MEAN\_BEP_n = \max(MEAN\_BEP_{n,measure}, MEAN\_BEP_{threshold})$, where $MEAN\_BEP_{n,measure}$ is the measured MEAN_BEP for block n, and $MEAN\_BEP_{threshold}$ is the BEP threshold for the given transmission format, which is determined by its error correction capability. Further the $MEAN\_BEP_{threshold}$ is increased accordingly for each such decoding error, by setting $MEAN\_BEP_{threshold}(new) = MEAN\_BEP_{threshold}(old) + Step\_size(up)$ (step 1112). In such case, Step_size(up) (>=0) is the increment of MEAN_BEP threshold. This value can be obtained via simulation or experiment.

For each RLC block that is decoded successfully, two steps need to be performed. In a first step 1114, set $MEAN\_BEP_n = MEAN\_BEP_{n,measure}$. In a second step, the $MEAN\_BEP_{threshold}$ is set accordingly for each success by setting $MEAN\_BEP_{threshold}(new) = MEAN\_BEP_{threshold}(old) - Step\_size(down)$ (step 1116). At step 1116, Step_size (down) (>=0) is the decrement of MEAN_BEP threshold. Again this value can be obtained via simulation or experiment and it is usually smaller than Step_size(up) to maintain the stability of the system. From each of steps 1112 and 1116 operation returns to step 1102.

The advantage of the operations illustrated in FIG. 11 is that the reported channel quality (e.g. MEAN_BEP) is directly related to the historical decoding success rate on the downlink, which is normally represented by block error rate (BLER). As a result, if the wireless terminal experiences more decoding errors on the downlink, the corresponding channel quality will be adjusted downward, which facilitates the network to use more robust transmission format. This significantly reduces the transmission problem due to measurement errors or un-matching link adaptation thresholds. This feature is especially useful when the wireless terminal operates in low RSSI conditions or experiences some unpredictable fading conditions.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to determine a bit error probability (BEP) of received Radio Frequency (RF) burst(s) within a data frame received from a servicing base station by a wireless terminal in a cellular wireless communication system, the method comprising:
   receiving the RF burst of the data frame from the servicing base station;
   determining a signal to noise ratio (SNR) of the RF burst;
   extracting a sequence of soft decisions from the RF burst;
   decoding the sequence of soft decisions to produce a data block;
   determining whether decoding of the sequence of soft decisions was successful;
   re-encoding the data block to produce a sequence of re-encoded decisions when the sequence of soft decisions decoded favorably;
   comparing the sequence of soft decisions to the sequence of re-encoded decisions to produce a re-encoded bit error (RBER);
   determining the BEP based on;
      when decoding is unsuccessful, an estimated BEP derived from the SNR; and
      when decoding is successful, the estimated BEP and the RBER.

2. The method of claim 1, wherein the sequence of soft decisions are extracted from data bits within the RF burst.

3. The method of claim 1, wherein the sequence of soft decisions are extracted from training sequences within the RF burst.

4. The method of claim 1, wherein the sequence of soft decisions are protected by fire coding and convolutional coding.

5. The method of claim 1, wherein the SNR is derived from training sequences within the RF burst.

6. The method of claim 1, wherein SNR maps to the estimated BEP based on a modulation format of the RF burst.

7. The method of claim 6, wherein the modulation format of the RF burst is GMSK or 8PSK.

8. The method of claim 1, further comprising setting the BEP to a BEP threshold when decoding is unsuccessful and the BEP threshold is greater than the estimated BEP.

9. The method of claim 8, wherein the BEP threshold is based on a Coding Scheme of the RF burst.

10. The method of claim 1, wherein the wireless terminal operates according to the GSM standard.

11. A wireless terminal that comprises:
   a Radio Frequency (RF) front end;
   a baseband processor communicatively coupled to the RF front end;

an enCOder/DECoder (CODEC) processing module communicatively coupled to the baseband processor;
wherein, the RF front end, the baseband processor, and the CODEC processing module are configured to:
receive a RF burst from the a servicing base station;
determine a signal to noise ratio (SNR) of the RF burst;
extract a sequence of soft decisions from the RF burst;
decode the sequence of soft decisions to produce a data block;
determine whether decoding of the sequence of soft decisions was successful;
re-encode the data block to produce a sequence of re-encoded decisions when the sequence of soft decisions decoded favorably; and
compare the sequence of soft decisions to the sequence of re-encoded decisions to produce a re-encoded bit error (RBER);
determine the Bit Error Probability (BEP) based on;
when decoding is unsuccessful, an estimated BEP derived from the SNR; and
when decoding is successful, the estimated BEP and the RBER; and
report the BEP to a servicing base station.

12. The wireless terminal of claim 11, wherein the RF front end, the baseband processor, and the CODEC processing module extract the sequence of soft decisions from data bits within the RF burst.

13. The wireless terminal of claim 11, wherein the RF front end, the baseband processor, and the CODEC processing module extract the sequence of soft decisions extracted from a training sequence within the RF burst.

14. The wireless terminal of claim 11, wherein the sequence of soft decisions are protected by fire coding and convolutional coding.

15. The wireless terminal of claim 11, wherein the SNR is derived from a training sequence within the RF burst.

16. The wireless terminal of claim 11, wherein SNR maps to the estimated BEP based on a modulation format of the RF burst.

17. The wireless terminal of claim 11, wherein the modulation format of the RF burst is GMSK or 8 PSK.

18. The wireless terminal of claim 11, wherein the soft decisions decoding unfavorably corresponds to the sequence of soft decisions having a bit error rate (BER) exceeding a threshold value, and wherein determining the BEP when the sequence of soft decisions decoded unfavorably is based upon estimated BEP and the BER exceeding the threshold value.

19. The wireless terminal of claim 11, wherein the BEP threshold is based on a Coding Scheme of the RF burst.

20. The wireless terminal of claim 11, wherein the wireless terminal operates according to the GSM standard.

21. The wireless terminal of claim 11, wherein, the RF front end, the baseband processor, and the CODEC processing module are further operable 4 e to:
process the first RF burst to produce a baseband signal; and
extract the sequence of soft decisions from the baseband signal.

22. A wireless terminal that comprises:
a Radio Frequency (RF) front end; and
a baseband processor communicatively coupled to the RF front end;
wherein, the RF front end and the base band processor are configured to:
receive the RF burst of the data frame from the servicing base station;
determine a signal to noise ratio (SNR) of the RF burst;
extract a sequence of soft decisions from the RF burst;
decode the sequence of soft decisions to produce a data block;
re-encode the data block to produce a sequence of re-encoded decisions when the sequence of soft decisions decoded favorably; and
compare the sequence of soft decisions to the sequence of re-encoded decisions to produce a re-encoded bit error (RBER);
determine the Bit Error Probability (BEP) based on:
an estimated BEP derived from the SNR of the RF burst when the sequence of soft decisions decoded unfavorably; and
the estimated BEP and the RBER when the sequence of soft decisions decoded favorably; and
report the BEP to a servicing base station.

23. The Wireless terminal of claim 22, wherein the RF front end and the baseband processor extract the sequence of soft decisions from data bits within the RF burst.

24. The wireless terminal of claim 22, wherein the RF front end and the baseband processor extract the sequence of soft decisions extracted from a training sequence within the RF burst.

25. The wireless terminal of claim 22, wherein the sequence of soft decisions are protected by fire coding and convolutional coding.

26. The wireless terminal of claim 22, wherein the SNR is derived from a training sequence within the RF burst.

27. The wireless terminal of claim 22, wherein SNR maps to the estimated BEP and based on a modulation format of the RF burst, wherein the estimated BEP is stored in memory operablye coupled to the baseband processor and the CODEC processing module.

28. The wireless terminal of claim 22, wherein the modulation format of the RF burst is GMSK or 8PSK.

29. The wireless terminal of claim 22, wherein the soft decisions decoding unfavorably corresponds to the sequence of soft decisions having a bit error rate (BER) exceeding a threshold value, and wherein determining the BEP when the sequence of soft decisions decoded unfavorably is based upon estimated BEP and the BER exceeding the threshold value.

30. The wireless terminal of claim 22, wherein the threshold value is based on a Coding Scheme of the RF burst.

31. The wireless terminal of claim 22, wherein the wireless terminal operates according to the GSM standard.

32. The wireless terminal of claim 22, wherein, the RF front end and the baseband processor are further operable to:
process the first RF burst to produce a baseband signal; and
extract the sequence of soft decisions from the baseband signal.

33. A method to determine a bit error probability (BEP) of received Radio Frequency (RF) burst(s) within a data frame received from a servicing base station by a wireless terminal in a cellular wireless communication system, the method comprising:
receiving the RF burst of the data frame from the servicing base station;
determining a signal to noise ratio (SNR) of the RF burst;
extracting a sequence of soft decisions from the RF burst;
decoding the sequence of soft decisions to produce a data block;
re-encoding the data block to produce a sequence of re-encoded decisions when the sequence of soft decisions decoded favorably;

comparing the sequence of soft decisions to the sequence of re-encoded decisions to produce a re-encoded bit error (RBER);

determining the BEP based on an estimated BEP derived from the SNR of the RF burst and the RBER, wherein:

the estimated BEP is weighed more heavily when the sequence of soft decisions decoded unfavorably;

the RBER corresponds to the sequence of soft decisions having a bit error rate (BER) exceeding a threshold value when the sequence of soft decisions decoded unfavorably; and the RBER is weighed more heavily when the sequence of soft decisions decoded favorably.

34. The method of claim 33, wherein the sequence of soft decisions are extracted from data bits within the RF burst.

35. The method of claim 33, wherein the sequence of soft decisions are extracted from a training sequence within the RF burst.

36. The method of claim 33, wherein the sequence of soft decisions are protected by fire coding and convolutional coding.

37. The method of claim 33, wherein the SNR is derived from a training sequence within the RF burst.

38. The method of claim 33, wherein SNR maps to the estimated BEP based on a modulation format of the RF burst.

39. The method of claim 38, wherein the modulation format of the NY burst is GMSK or 8 PSK.

40. The method of claim 33, wherein the threshold value is based on a Coding Scheme of the RF burst.

41. The method of claim 33, wherein the wireless terminal operates according to the GSM standard.

* * * * *